(12) United States Patent
Kondo et al.

(10) Patent No.: US 11,366,196 B2
(45) Date of Patent: Jun. 21, 2022

(54) RADAR DEVICE

(71) Applicant: DENSO CORPORATION, Kariya (JP)

(72) Inventors: Katsuhiko Kondo, Nisshin (JP); Yusuke Akamine, Nisshin (JP); Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 218 days.

(21) Appl. No.: 16/545,265

(22) Filed: Aug. 20, 2019

(65) Prior Publication Data

US 2019/0377059 A1 Dec. 12, 2019

Related U.S. Application Data

(63) Continuation of application No. PCT/JP2018/006002, filed on Feb. 20, 2018.

(30) Foreign Application Priority Data

Feb. 22, 2017 (JP) .............................. JP2017-031309

(51) Int. Cl.
| | |
|---|---|
| *G01S 7/02* | (2006.01) |
| *G01S 13/87* | (2006.01) |
| *G01S 13/93* | (2020.01) |
| *G08G 1/16* | (2006.01) |
| *H01Q 1/32* | (2006.01) |
| *H01Q 3/36* | (2006.01) |
| *H01Q 21/06* | (2006.01) |
| *H01Q 21/24* | (2006.01) |
| *H04B 7/0413* | (2017.01) |
| *G01S 13/02* | (2006.01) |

(52) U.S. Cl.
CPC ................ *G01S 7/02* (2013.01); *G01S 13/87* (2013.01); *G01S 13/93* (2013.01); *G08G 1/16* (2013.01); *H01Q 1/3233* (2013.01); *H01Q 3/36* (2013.01); *H01Q 21/06* (2013.01); *H01Q 21/24* (2013.01); *H04B 7/0413* (2013.01); *G01S 2013/0245* (2013.01)

(58) Field of Classification Search
CPC ..... G01S 7/02; G01S 13/87; G01S 2013/0245
See application file for complete search history.

(56) References Cited

U.S. PATENT DOCUMENTS

| | | | |
|---|---|---|---|
| 8,077,076 B2 * | 12/2011 | Walker .................. | G01S 13/345 342/128 |
| 10,082,570 B1 * | 9/2018 | Izadian ................... | H01P 5/182 |

(Continued)

FOREIGN PATENT DOCUMENTS

| | | |
|---|---|---|
| JP | 2010-139367 A | 6/2010 |
| JP | 2014-064114 A | 4/2014 |

(Continued)

*Primary Examiner* — Marcus E Windrich
(74) *Attorney, Agent, or Firm* — Maschoff Brennan

(57) ABSTRACT

The radar device is provided with a transmission array antenna, phase shifters, a reception array antenna, a transmission control unit and a signal processing unit. The transmission control unit transmits transmission waves in either a directivity control mode or a MIMO mode. The directivity control mode controls directivity of the transmission array antenna by controlling the phase shifters. The MIMO mode transmits transmission waves so as not to interfere with each other from the selected at least two transmission antenna elements.

8 Claims, 16 Drawing Sheets

(56) References Cited

U.S. PATENT DOCUMENTS

| | | | |
|---|---|---|---|
| 2012/0194377 A1* | 8/2012 | Yukumatsu | G01S 13/0209 |
| | | | 342/368 |
| 2015/0268336 A1 | 9/2015 | Yukumatsu et al. | |
| 2016/0097847 A1* | 4/2016 | Loesch | G01S 13/931 |
| | | | 342/156 |
| 2016/0365631 A1* | 12/2016 | Huang | G01S 13/86 |
| 2017/0131392 A1* | 5/2017 | Schoor | G01S 13/584 |
| 2017/0207531 A1* | 7/2017 | Murakowski | H01Q 21/22 |
| 2017/0307749 A1 | 10/2017 | Shimizu | |
| 2018/0011170 A1* | 1/2018 | Rao | G01S 13/42 |
| 2018/0149730 A1* | 5/2018 | Li | G01S 7/0234 |
| 2018/0166794 A1* | 6/2018 | Raphaeli | H01Q 21/28 |
| 2019/0086535 A1* | 3/2019 | Meyer | G01S 7/032 |

FOREIGN PATENT DOCUMENTS

| | | |
|---|---|---|
| JP | 5464152 B2 | 4/2014 |
| JP | 2016-130654 A | 7/2016 |

* cited by examiner

FCVW OPERATION

CTA OPERATION

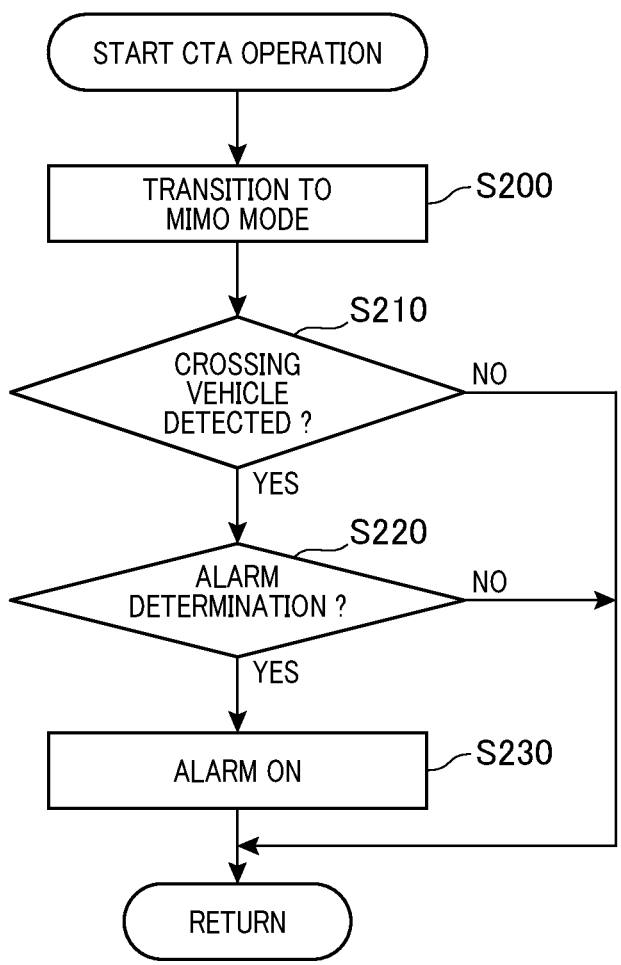

RADAR DEVICE

CROSS-REFERENCE TO RELATED APPLICATION

The present application is a continuation application of International Application No. PCT/JP2018/006002, filed Feb. 20, 2018, which claims priority to Japanese Patent Application No. 2017-031309, filed Feb. 22, 2017. The contents of these applications are incorporated herein by reference in their entirety.

BACKGROUND

1. Technical Field

The present disclosure relates to a radar device.

2. Related Art

There has been a radar device provided with a transmission array antenna, a phase shifter provided for each unit antenna included in the transmission array antenna, and a reception array antenna, mounted on a vehicle.

SUMMARY

The present disclosure provides a radar device. One mode of the present disclosure is a radar device provided with a transmission array antenna, phase shifters, a reception array antenna, a transmission control unit and a signal processing unit. The transmission control unit transmits transmission waves in either a directivity control mode or a MIMO mode. The directivity control mode controls directivity of the transmission array antenna by controlling the phase shifters. The MIMO mode transmits transmission waves so as not to interfere with each other from the selected at least two transmission antenna elements.

BRIEF DESCRIPTION OF THE DRAWINGS

In the accompanying drawings:

FIG. 16 is a flow chart showing processing procedures of CTA operation.

DETAILED DESCRIPTION OF THE PREFERRED EMBODIMENTS

Figure 1:
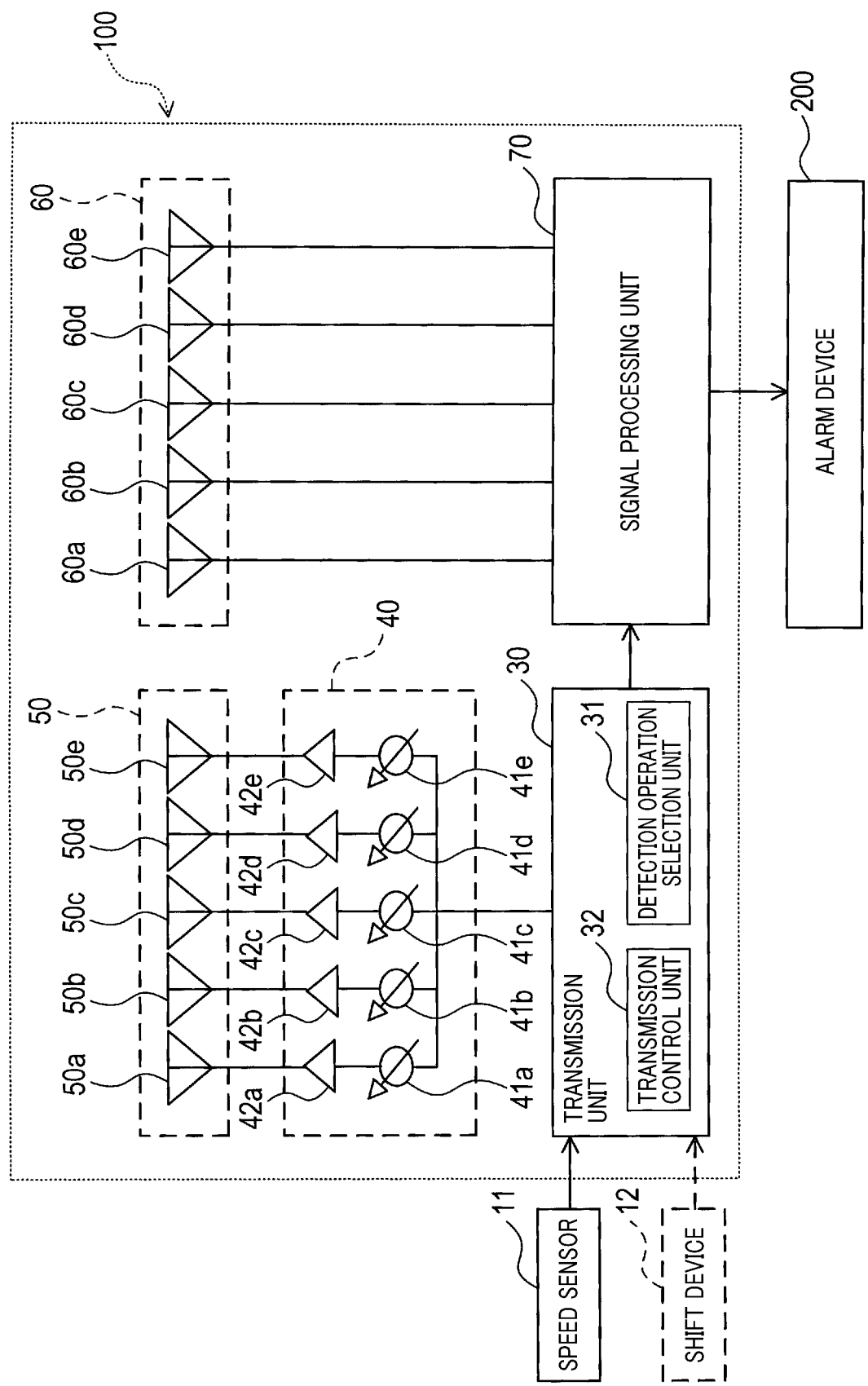
FIG. 1 is a chart showing the entire configuration of a radar device.

The inventor of the present disclosure has studied the following technique related to a radar device.

Japanese Patent No. 5464152 (JP-5464152-B) discloses a radar device provided with a transmission array antenna, a phase shifter provided for each unit antenna included in the transmission array antenna, and a reception array antenna, mounted on a vehicle. When the host vehicle is moving forward, the radar device operates in a rear approaching vehicle detection mode where a vehicle approaching the host vehicle from behind is detected. When the host vehicle is moving rearward, the radar device operates in a reversing crossing vehicle detection mode where a vehicle crossing behind the host vehicle is detected. When the radar device operates in each mode, detection areas are set in ranges suitable for each mode.

In the rear approaching vehicle detection mode, it is desirable to set the detection areas in rearward limited ranges, and it is effective to control the phase shifter to control directivity. On the other hand, in the reversing crossing vehicle detection mode, it is desirable to set the detection areas to be wide, and there is no need to control directivity. When operating the radar device in the reversing crossing vehicle detection mode, only one unit antenna is necessary. The inventors performed intensive studies and found that, when it is not necessary to control directivity, the number of the unit antennas becomes excessive in the above radar device, and therefore, there is room to improve the effectiveness of the hardware configuration in the above radar device.

In one mode of the present disclosure, it is desirable to effectively use the hardware configuration and provide a radar device with excellent performance.

One mode of the present disclosure is a radar device provided with a transmission array antenna, a phase shifter, a reception array antenna, a transmission control unit, and a signal processing unit. The transmission array antenna is provided with a plurality of transmission antenna elements, and is configured to transmit transmission waves. The phase shifter is provided with each of at least two of the transmission antenna elements, and is configured to change the phase of the transmission waves transmitted from the transmission antenna element provided with the phase shifter. The reception array antenna is provided with a plurality of reception antenna element, and is configured to receive reflected waves generated by a target reflecting the transmitted transmission waves. The transmission control unit is configured to transmit the transmission waves via the transmission array antenna by either one of the operation modes of directivity control mode or the MIMO mode. The directivity control mode is an operation mode of the radar device that controls the directivity of the transmission array antenna by controlling the phase shifter. The MIMO mode is an operation mode of the radar device that selects at least two transmission antenna elements from the plurality of transmission antenna elements, and transmits the transmission waves so as not to interfere with each other from the selected transmission antenna elements. The signal processing unit is configured to estimate the direction of the target from the reflected waves received by the reception array antenna.

According to one mode of the present disclosure, transmission waves are transmitted in either the directivity control mode or the MIMO mode. Further, the reflected waves generated by the target reflecting the transmitted transmission waves are received by the reception array antenna, and the direction of the target is estimated from the received reflected waves.

Therefore, when detecting a target present in a specific direction, by operating the radar device in the directivity control mode, it is possible to detect accurately the target present in a specific direction. On the other hand, when detecting a target present in a wide range of directions, by operating the radar device in the MIMO mode, it is possible to virtually increase the number of reception antenna elements and to improve the azimuth resolution of the radar device. As a result, it is possible to accurately estimate the orientation of the detected target in a wide range of directions. That is, the hardware configuration of the radar device provided with a plurality of transmission antenna elements can be effectively used, and it is possible to realize excellent performance.

Meanwhile, reference signs in parentheses recited in Claims indicate correspondence with specific means described in the embodiment described later as one mode, and it is not intended to limit the technical scope of the present disclosure.

The above and other objectives, features and advantages of the present disclosure will be made more clear by the following detailed description, given referring to the appended drawings.

Hereinafter, embodiments of the present disclosure will be described with reference to the drawings.

[1. Entire Configuration]

First, the configuration of a radar device 100 according to the present embodiment will be described with reference to FIG. 1. In the present embodiment, it is assumed that the radar device 100 is mounted on a vehicle. The radar device 100 is a millimeter wave radar provided with a transmission unit 30, a signal control unit 40, a transmission array antenna 50, a reception array antenna 60, and a signal processing unit 70.

The transmission unit 30 is provided with a detection operation selection unit 31 and a transmission control unit 32. The detection operation selection unit 31 selects a suitable detection operation from among multiple detection operations based on a measurement situation. The multiple detection operations are operations having different detection areas Ad from one another, and the details thereof will be described later. In the present embodiment, based on the vehicle speed information of the host vehicle received from the vehicle speed sensor 11, a suitable detection operation is selected from among the multiple detection operations.

The transmission control unit 32 operates the radar device 100 in an operation mode depending on the detection operation selected by the detection operation selection unit 31. That is, the transmission control unit 32 transmits transmission waves from the transmission array antenna 50 in an operation mode depending on the selected detection operation. Specifically, the transmission control unit 32 generates a modulation signal, a transmission signal modulated according to the modulation signal, and a transmission control signal, and supplies the generated transmission signal and transmission control signal to the signal control unit 40. Meanwhile, a modulation system may be anything such as a two-frequency CW system, a multi-frequency CW system, and an FMCW system, and is not particularly limited.

The signal control unit 40 is provided with phase shifters 41a to 41e and amplifiers 42a to 42e corresponding to the phase shifters 41a to 41e. A set of each of the phase shifters 41a to 41e and each of the amplifiers 42a to 42e is connected to a transmission path between the transmission unit 30 and each of the transmission antenna elements 50a to 50e included in the transmission array antenna 50. The phase shifters 41a to 41e control the phase of the transmission signal according to the transmission control signal. Moreover, the amplifiers 42a to 42e control the amplitude of the transmission signal according to the transmission control signal. The amplifiers 42a to 42e also function as switches for blocking the transmission path by setting the amplification factor to zero.

The transmission array antenna 50 is an array antenna including M (M is an integer of 2 or larger) transmission antenna elements. In the example shown in FIG. 1, M=5, and the transmission array antenna 50 is provided with five transmission antenna elements 50a to 50e. The transmission antenna elements 50a to 50e transmit transmission waves that are electromagnetic waves based on the transmission signals output from the amplifiers 42a to 42e, respectively. At this time, when there is an amplifier whose amplification factor is set to zero among the amplifiers 42a to 42e, no transmission signal is output from the amplifier whose amplification factor is set to zero, and transmission waves are not output from the corresponding transmission antenna elements.

The reception array antenna 60 is an array antenna including N (N is an integer of 2 or larger) reception antenna elements. In the example shown in FIG. 1, N=5, and the reception array antenna 60 is provided with five reception antenna elements 60a to 60e. Each of the reception antenna elements 60a to 60e receives reflected waves as reception signals generated by target P reflecting the transmission waves. Further, each of the reception antenna elements 60a to 60e outputs the received reception signals to the signal processing unit 70.

The signal processing unit 70 mixes the transmission signal supplied from the transmission unit 30 and the reception signal output from the reception array antenna 60 to generate a beat signal. Then, the signal processing unit 70 estimates the relative speed and the position of the target P in relation to the radar device 100 from the beat signal. Specifically, the signal processing unit 70 analyzes the frequency of the beat signal to detect the moving target P, and estimates the relative speed and the distance of the detected target P in relation to the radar device 100. Furthermore, the signal processing unit 70 applies an azimuth expansion algorithm such as DBF, Capon, MUSIC and the like to the beat signal to estimate the arrival direction of the reflected waves, that is, the orientation of the target P in relation to the radar device 100. DBF stands for Digital Beam Forming, and MUSIC stands for Multiple Signal Classification.

Furthermore, the signal processing unit 70 estimates the possibility of the target P colliding with the host vehicle on the basis of the estimated relative speed, distance, and orientation of the target P, and when there is a possibility of a collision, an alarm device 200 outputs an alarm in order to alert the driver. Further, the functions of the transmission unit 30 and the signal processing unit 70 may be realized by the CPU executing a program stored in the memory, or realized by using hardware combining a logic circuit, an analog circuit and the like. Moreover, the functions of the transmission unit 30 and the signal processing unit 70 may be realized by using both software and hardware.

The alarm device 200 is a door mirror, an indicator provided in the vehicle interior, a speaker in the vehicle interior, a display in the vehicle interior and the like. The alarm device 200 blinks, outputs warning sounds or voices, or displays a warning depending on an instruction of the alarm output from the signal processing unit 70.

[2. Operation Mode]

Figure 2:
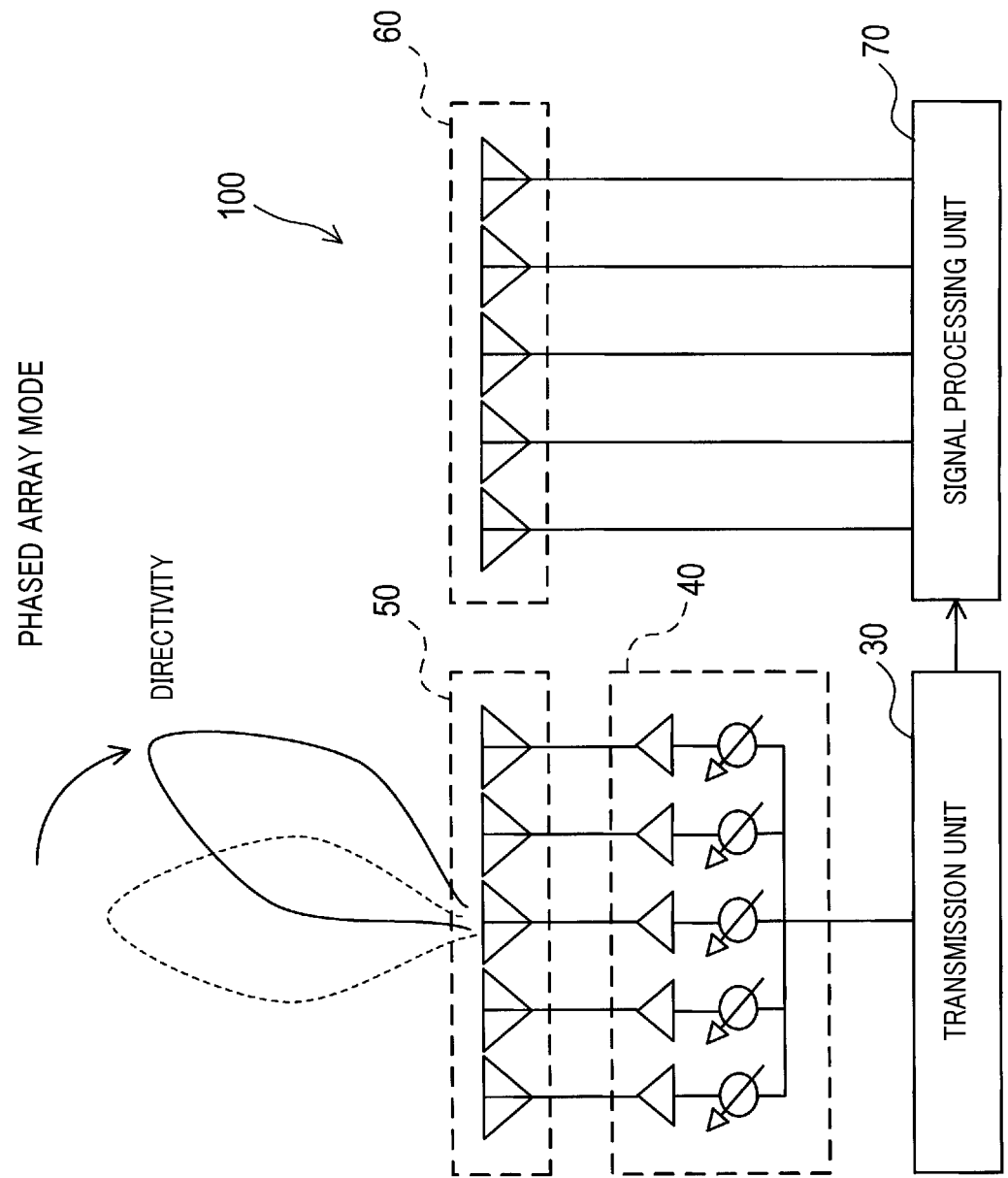
FIG. 2 is an illustrative chart of a phased array mode.

Next, the operation mode of the radar device 100 will be described with reference to FIGS. 2 and 3. There are two operation modes in the radar device 100, a phased array mode and a MIMO mode. MIMO stands for Multi Input Multi Output.

The phased array mode is an operation mode to control directivity of the transmission waves transmitted from the transmission array antenna 50, by individually controlling the phases of the transmission waves transmitted from each of the transmission antenna elements 50a to 50e using the phase shifters 41a to 41e. As shown in FIG. 2, when operating the radar device 100 in the phased array mode, transmission waves having directivity narrower than those of the MIMO mode are transmitted in a specific direction. In the present embodiment, the phased array mode is equivalent to the directivity control mode.

Figure 3:
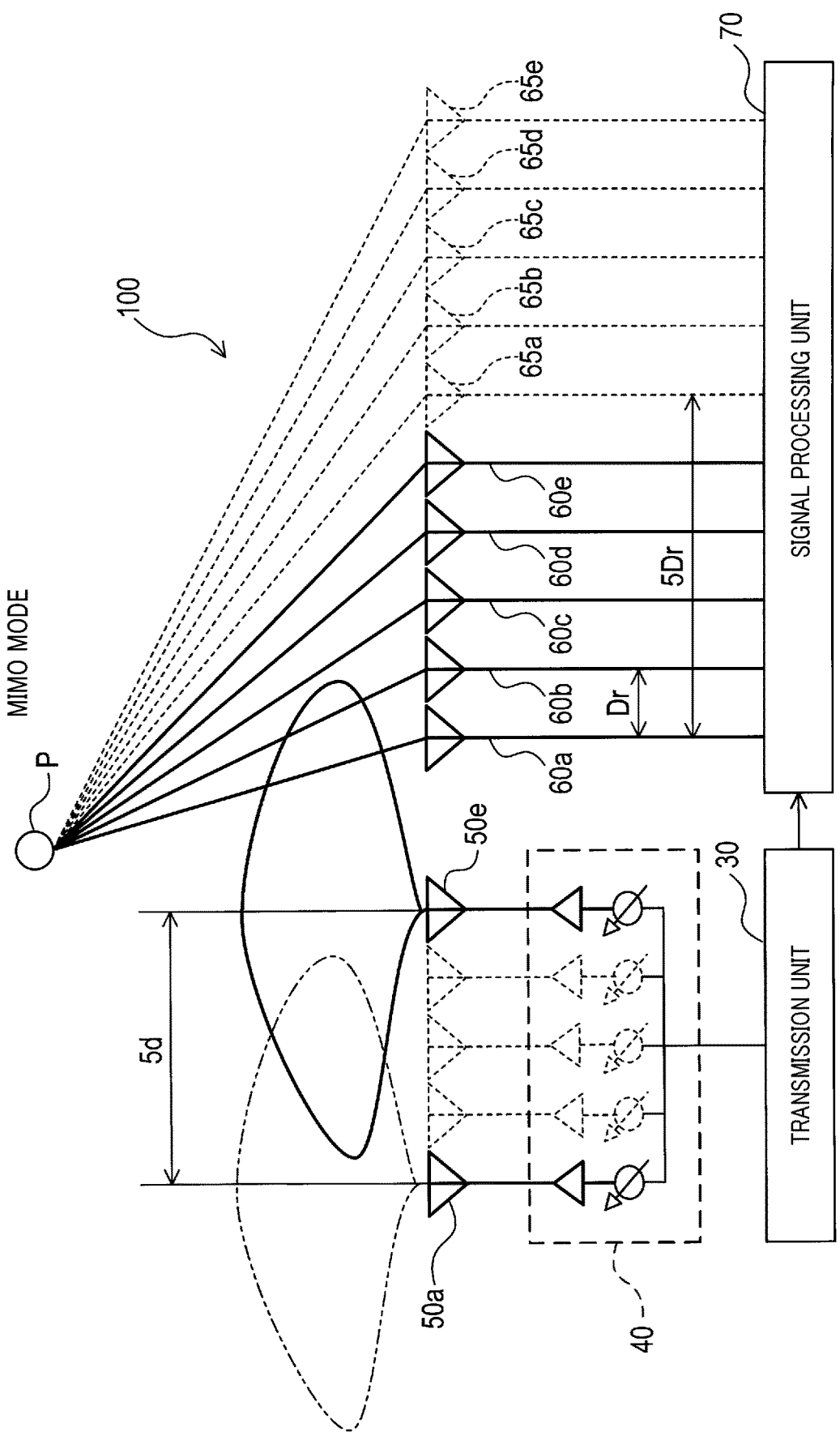
FIG. 3 is an illustrative chart of a MIMO mode.

The MIMO mode, as shown in FIG. 3, is an operation mode where at least two transmission antenna elements are selected from the transmission antenna elements 50a to 50e, and transmission waves are transmitted from the selected transmission antenna elements. In the MIMO mode, the transmission control unit 32 simultaneously transmits transmission waves of different frequencies from one another from different transmission antenna elements so that transmission waves transmitted from the selected multiple transmission antenna elements do not interfere with one another. Alternatively, in the MIMO mode, the transmission control unit 32 transmits transmission waves at different timings from one another from different transmission antenna elements so that transmission waves transmitted from the selected multiple transmission antenna elements do not interfere with one another. That is, in the MIMO mode, the transmission control unit 32 transmits transmission waves from a plurality of transmission antenna elements in frequency division multiplexing or time division multiplexing. In the present embodiment, in the MIMO mode, the transmission control unit 32 transmits transmission waves from the plurality of transmission antenna elements in frequency division multiplexing. Moreover, in the MIMO mode, the amplification factor of the amplifier corresponding to a non-selected transmission antenna element is set to zero so that the transmission control unit 32 does not transmit the transmission waves from the non-selected transmission antenna element.

The transmission control unit 32, when transmitting transmission waves from the plurality of transmission antenna elements in frequency division multiplexing, controls at least one phase shifter among the phase shifters provided in the selected multiple transmission antenna elements, and changes the frequency of the transmission waves from the frequency in the phased array mode. For example, when two transmission antenna elements are selected in the MIMO mode, the transmission control unit 32 has only to control one phase shifter provided to either one of the transmission antenna elements. Further, the transmission control unit 32 may change the frequency of the transmission waves transmitted from either one of transmission antenna elements, and the frequency of the transmission waves transmitted from the other transmission antenna element may be set to the same frequency as that in the phased array mode. Moreover, when three transmission antenna elements are selected in the MIMO mode, the transmission control unit 32 may control the phase shifters provided in two of the three transmission antenna elements, so that frequencies of the transmission waves transmitted from the three transmission antenna elements become different from one another. The frequency of the transmission waves can be changed by controlling the phase shifter with the transmission control unit 32, and continuously changing the phase of the transmission waves. As shown in FIG. 3, in the MIMO mode, transmission waves having directivity wider than the directivity of transmission waves in the phased array mode are transmitted from each of the transmission antenna elements.

When operating the radar device 100 in the MIMO mode, the number of reception antenna elements is virtually increased, and the estimation accuracy in the arrival direction of the reflected waves is improved. As shown in FIG. 3, when transmission antenna elements 50a and 50e arranged at a distance of 5 Dr apart are selected, a virtual array antenna can be configured originating from a position at a distance of 5 Dr apart from the reception antenna element 60a. The virtual array antenna, similarly to the reception array antenna, includes five virtual antenna elements 65a to 65e. By selecting two transmission antenna elements 50a and 50e, the number of reception antenna elements is virtually doubled, so that the estimation accuracy of the orientation of the target P is improved.

[3. Configuration of Array Antenna]

Next, the configurations of the transmission array antenna 50 and the reception array antenna 60 of the radar device 100 will be described with reference to FIGS. 4 to 7.

When operating the radar device 100 in the MIMO mode, if the position of the reception antenna element and the virtual position of the virtual antenna element overlap, the reception signal received by the reception antenna element and the reception signal received by the virtual antenna element cannot be separated. As a result, the effect of improving the estimation accuracy of the orientation of the target P is reduced. Therefore, in the present embodiment, the transmission array antenna 50 and the reception array antenna 60 are configured such that the positions of a plurality of reception antenna elements do not coincide with the virtual positions of a plurality of virtual antenna elements.

Figure 4:
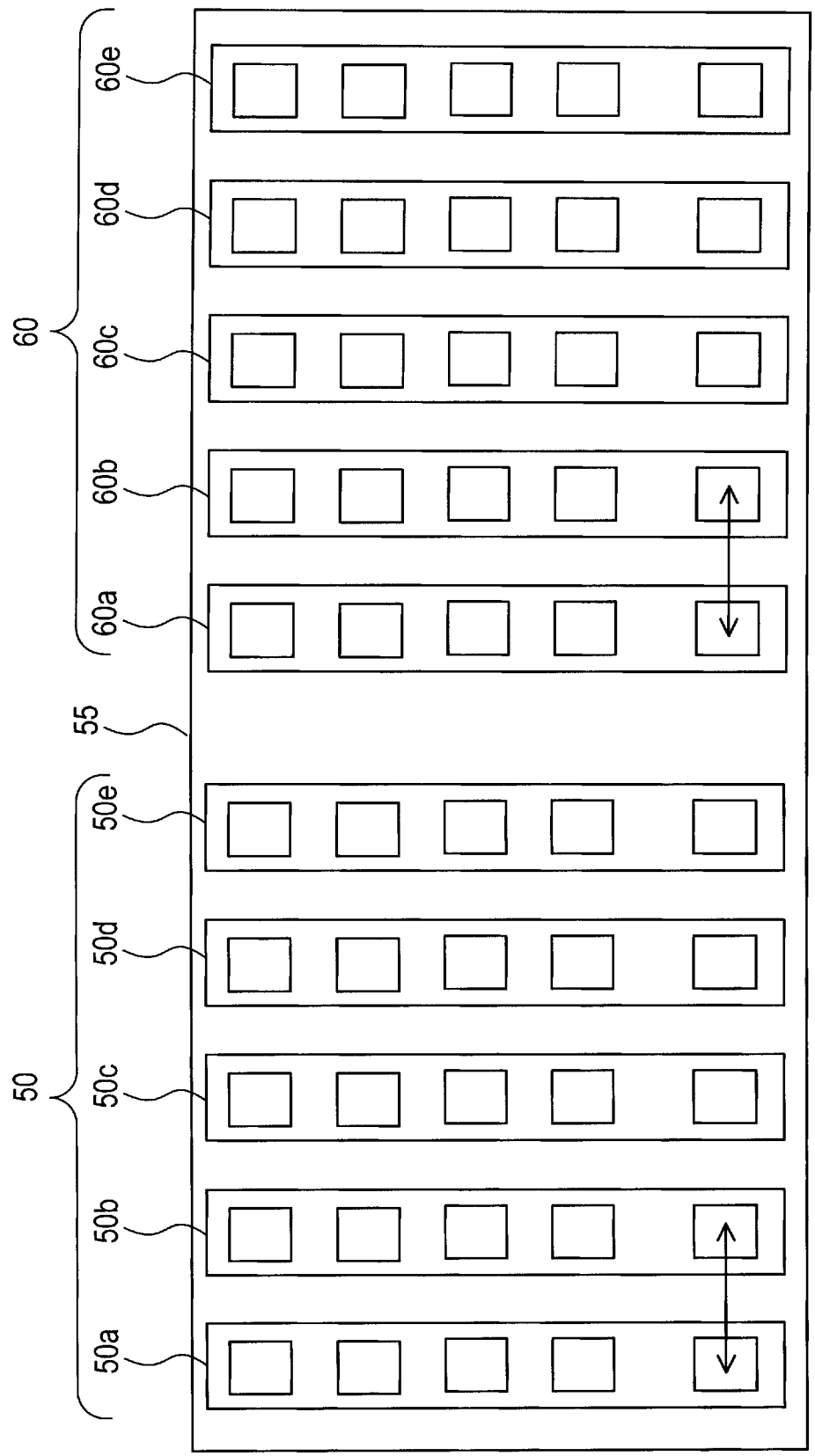
FIG. 4 is a chart showing an example of a pattern of transmission antenna elements and reception antenna elements formed on an antenna substrate.

FIG. 4 shows an example of the configuration of the transmission array antenna 50 and the reception array antenna 60. As shown in FIG. 4, the transmission array antenna 50 and the reception array antenna 60 are formed on the surface of an antenna substrate 55 which is a dielectric substrate. On the back surface of the antenna substrate 55, a ground plate which is a copper pattern covering the entire surface is formed. The transmission antenna elements 50a to 50e and the reception antenna elements 60a to 60e are arranged on a straight line on the antenna substrate 55. Hereinafter, the arrangement direction of the transmission antenna elements 50a to 50e and the reception antenna elements 60a to 60e will be referred to as an antenna arrangement direction. Moreover, the side of the transmission array antenna 50 is referred to as the left side, and the side of the reception array antenna 60 is referred to as the right side. That is, the left and the right directions of the antenna substrate 55 is the antenna arrangement direction.

Each of the transmission antenna elements 50*a* to 50*e* and the reception antenna elements 60*a* to 60*e* includes a plurality of conductor patches. The plurality of conductor patches is a rectangular copper pattern, and the conductor patches are arranged in a line at equal distances along the direction orthogonal to the antenna arrangement direction.

Figure 5:
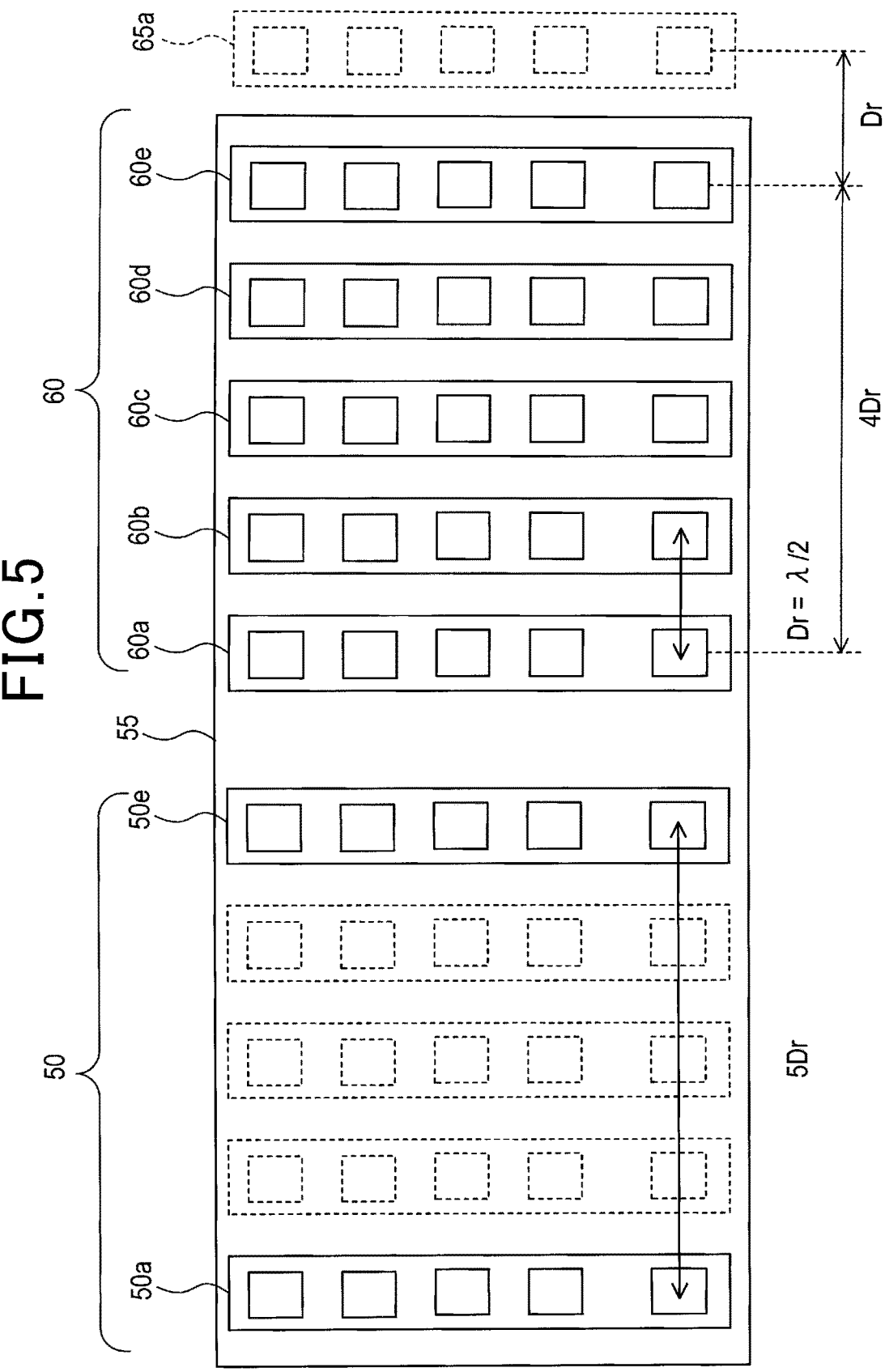
FIG. 5 is a chart showing transmission antenna elements and virtual reception antenna elements used in MIMO mode of transmission antenna elements formed on an antenna substrate.

The reception antenna elements 60*a* to 60*e* are arranged at equal distances Dr in the antenna arrangement direction. On the other hand, the transmission antenna elements 50*a* to 50*e* are arranged at equal distances Dt in the antenna arrangement direction. When the wavelength at the transmission frequency in the phased array mode is $\lambda$, Dr is set such that Dr=$\lambda$/2. Here, as shown in FIG. 5, the distance between the leftmost reception antenna element 60*a* and the rightmost reception antenna element is 4 Dr. Therefore, when the virtual array antenna is configured originating from the position 5 Dr apart from the reception antenna element 60*a*, the positions of the reception antenna elements 60*a* to 60*e* and the virtual positions of the virtual antenna elements 65*a* to 65*e* do not overlap.

That is, at least one of the distances between two different transmission antenna elements may be set to N×Dr or more. N is the number of reception antenna elements. Dr is a distance between adjoining reception antenna elements. In this way, in the MIMO mode, when the transmission control unit 32 selects two or more transmission antenna elements separated by N×Dr or more, the virtual antenna elements can be configured on the right side of the rightmost reception antenna element 60*e*.

Further, when Dt is set such that Dt=5/4×Dr, as shown in FIG. 5, the distance between the leftmost transmission antenna element 50*a* and the rightmost transmission antenna element 50*e* is 5 Dr. Therefore, in this case, in the MIMO mode, when the transmission control unit 32 selects the transmission antenna elements 50*a* and 50*e*, the virtual antenna elements 65*a* to 65*e* can be configured at positions not overlapping with the reception antenna elements 60*a* to 60*e*.

When the distance Dt between adjoining transmission antenna elements is set to Dr×N/(M−1) or more, the distance between the leftmost transmission antenna element and the rightmost transmission antenna element is always N×Dr or more. M is the number of transmission antenna elements. Therefore, in this case, in the MIMO mode, when the transmission control unit 32 selects the leftmost transmission antenna element and the rightmost transmission antenna element, the virtual antenna elements can be configured at positions not overlapping with the reception antenna elements.

Figure 6:
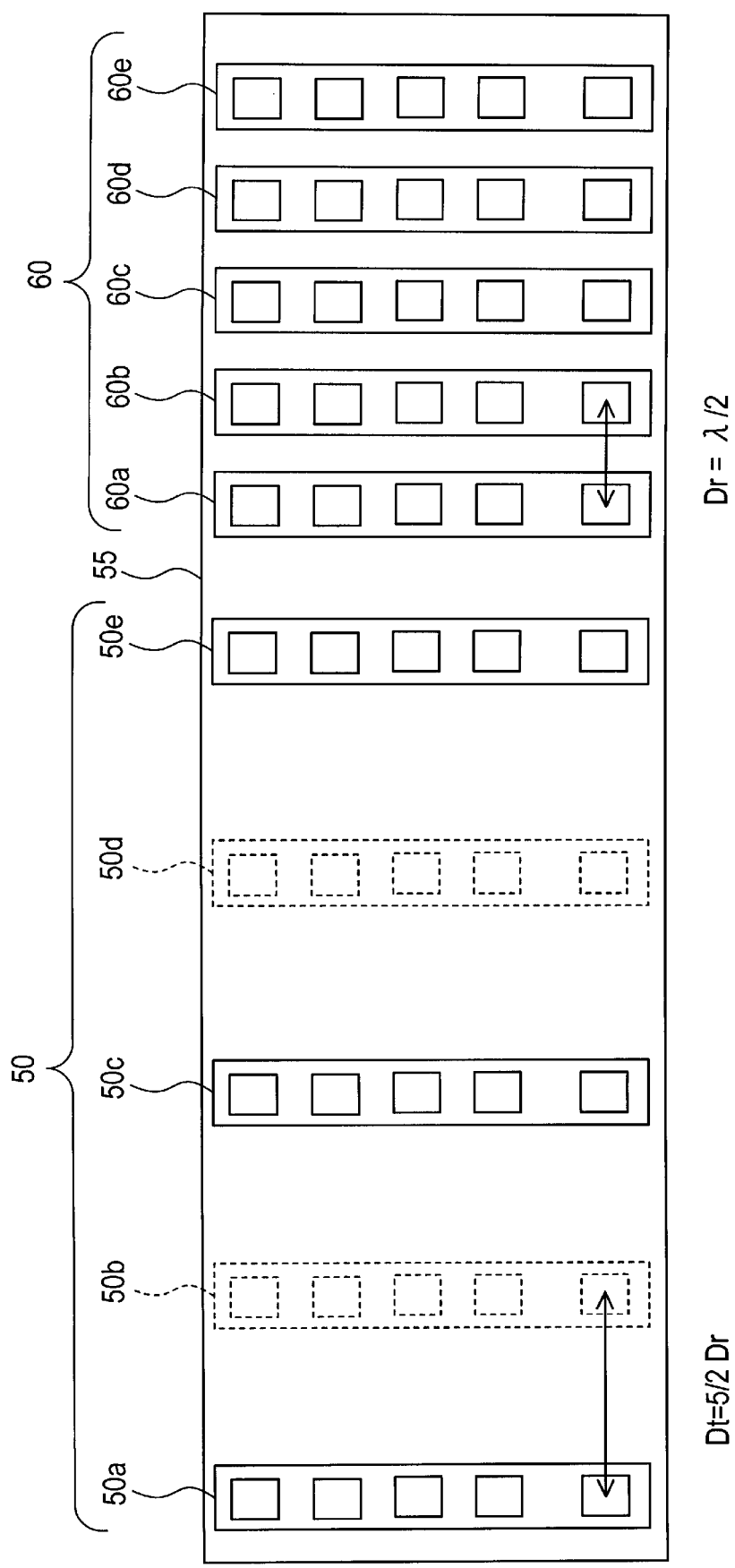
FIG. 6 is a chart showing another example of a pattern of transmission antenna elements and reception antenna elements formed on an antenna substrate.

Further, FIG. 6 shows another example of the configuration of the transmission array antenna 50. In this example, Dt is set such that Dt=5/2×Dr. As such, the distance between the leftmost transmission antenna element 50*a* and the central transmission antenna element 50*c*, and the distance between the central transmission antenna element 50*c* and the rightmost transmission antenna element 50*e* are 5 Dr. Therefore, in this example, in the MIMO mode, when the transmission control unit 32 selects the transmission antenna element 50*c* in addition to transmission antenna elements 50*a* and 50*e*, the virtual antenna elements can be configured at positions not overlapping with the reception antenna elements 60*a* to 60*e*. In this case, although the antenna substrate 55 grows in size as compared to that of the example of FIG. 4, the number of reception antenna elements is virtually tripled, and therefore, the estimation accuracy of the orientation of the target P is further improved.

Figure 7:
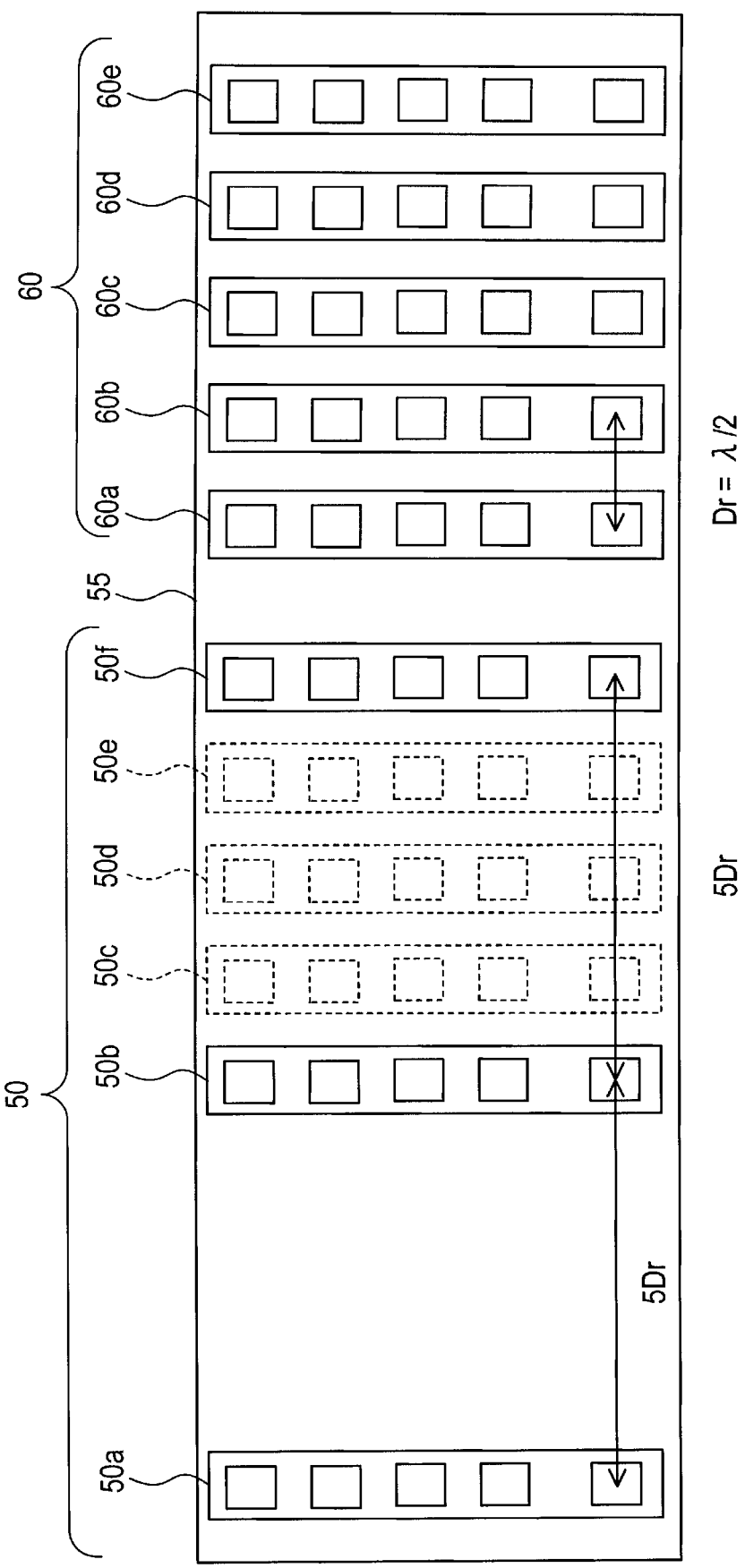
FIG. 7 is a chart showing still another example of a pattern of transmission antenna elements and reception antenna elements formed on an antenna substrate.

Further, FIG. 7 shows another example of the configuration of the transmission array antenna 50. In this example, the transmission array antenna 50 includes six transmission antenna elements 50*a* to 50*f*. Further, the transmission antenna elements 50*a* to 50*f* are not arranged at equal distances. The transmission antenna elements 50*a* and the transmission antenna element 50*b* are arranged at a distance of Dt=5 Dr apart, and the transmission antenna elements 50*b* to 50*f* are arranged at equal distances of Dt=5/4×Dr. Therefore, in this example, in the MIMO mode, the transmission control unit 32 may select the transmission antenna elements 50*a*, 50*b*, and 50*f*. As such, as long as the reception antenna elements are arranged at equal distances on a straight line, the transmission antenna elements do not need to be arranged at equal distances on a straight line.

Meanwhile, in the above examples, an example where the number of transmission antenna elements and the number of reception antenna elements are the same, and an example where the number of transmission antenna elements is larger than the number of reception antenna elements are shown. However, the number of reception antenna elements may be larger than the number of transmission antenna elements. It is only necessary that the relationship between the number of elements of the transmission antenna elements and the reception antenna elements, and the distance between two different transmission antenna elements meet the above-mentioned relationship.

[4. Detection Operation]

Next, detection operations that the radar device 100 mounted on a vehicle can perform will be described with reference to FIGS. 8 to 13. In the present embodiment, the radar device 100 is mounted at each of the four locations, that is on the left front side, the right front side, the left rear side, and the right rear side of the host vehicle V1. Specifically, the transmission array antenna 50 and the reception array antenna 60 are installed at each of the above-mentioned four locations.

By the way, the object to be detected may differ depending on the running conditions of the host vehicle V1. When the host vehicle V1 is traveling at a relatively low speed in the vicinity of an intersection, a parking lot and the like, the host vehicle V1 should detect vehicles crossing the front or the rear of the host vehicle V1 and avoid a collision with detected vehicles. On the other hand, when the host vehicle V1 is traveling on the road at a relatively high speed, other vehicles usually do not cross the front or the rear of the host vehicle V1, and therefore, the host vehicle V1 should detect other vehicles approaching the host vehicle V1 from the front or the rear and avoid a collision with the detected other vehicles. Therefore, the radar device 100 selects and executes an application of a different detection operation depending on the running conditions of the host vehicle V1.

Figure 8:
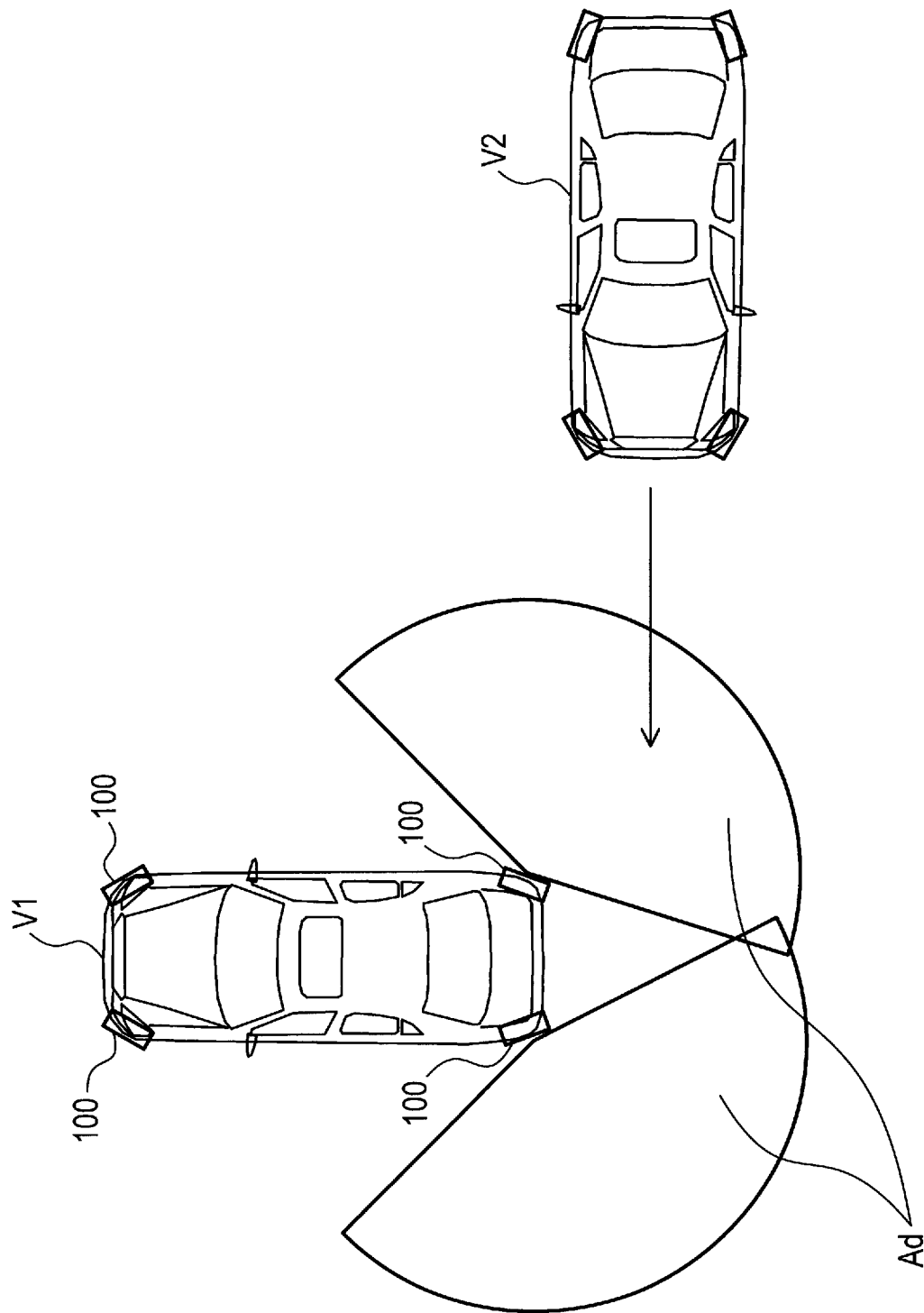
FIG. 8 is a chart showing detection areas when RCTA is in operation.

FIG. 8 shows a state of an RCTA operation. RCTA stands for Rear Cross Traffic Alert. The RCTA operation is an operation to detect another vehicle V2 crossing the rear of the host vehicle V1. When execution of the RCTA operation is selected, the transmission control unit 32 operates the radar device 100 mounted on each of the left rear side and the right rear side of the host vehicle V1 in the MIMO mode. In this case, as shown in FIG. 8, the detection areas Ad extend in a wide angular range and are ranges at a relatively short distance from the radar device 100 mounted on each of the left rear side and the right rear side.

Figure 9:
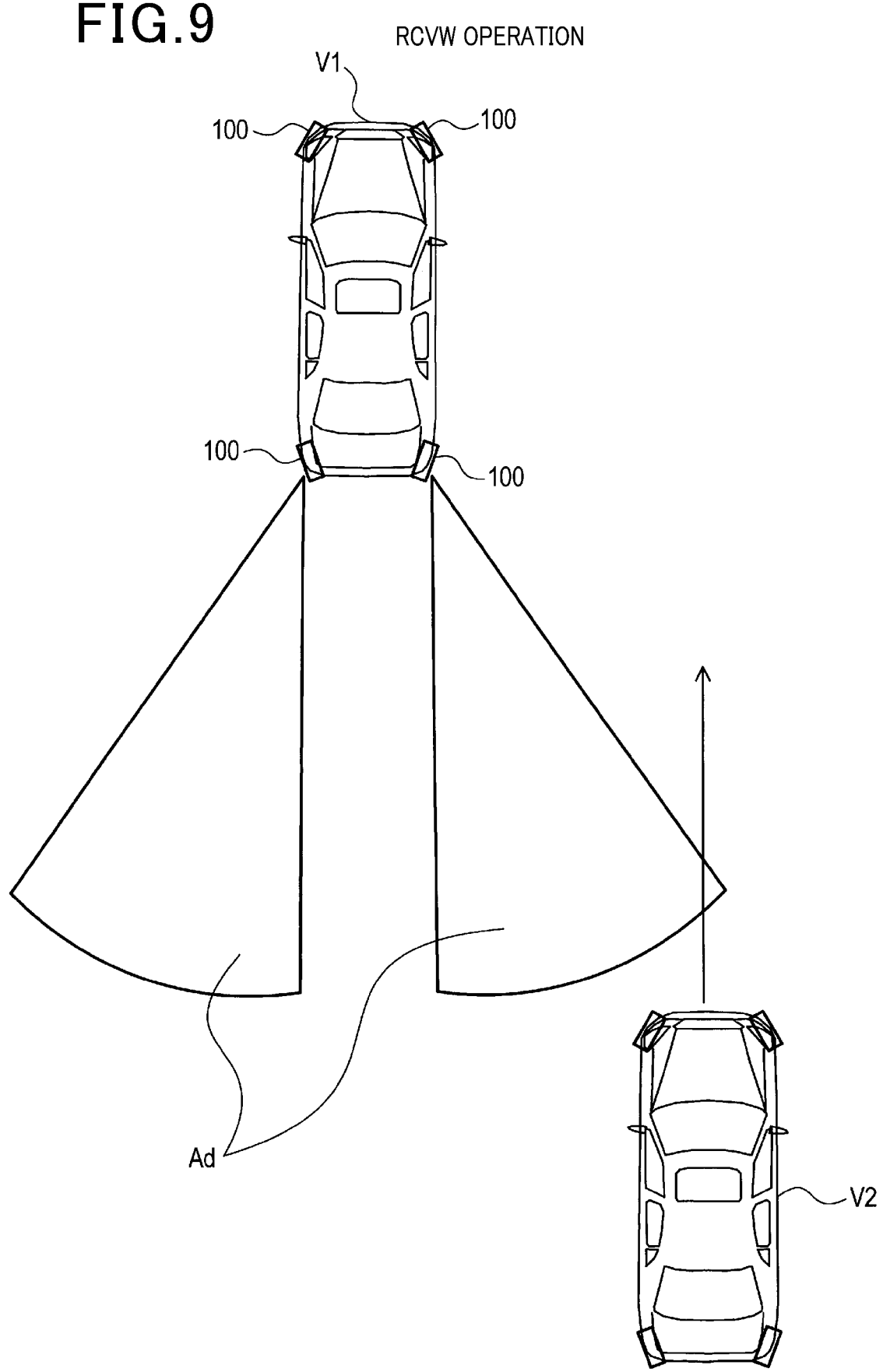
FIG. 9 is a chart showing detection areas when RCVW is in operation.

Next, FIG. 9 shows a state of an RCVW operation. RCVW stands for Rear Closing Vehicle Warning. The RCVW operation is an operation to detect another vehicle V2 approaching from the rear of the host vehicle V1. When execution of the RCVW operation is selected, the transmission control unit 32 operates the radar device 100 mounted on each of the left rear side and the right rear side of the host vehicle V1 in the phased array mode. In this case, as shown in FIG. 9, the detection areas Ad extend in a narrow direction and are ranges at a relatively long distance from the radar device 100 mounted on each of the left rear side and the right rear side.

Figure 10:
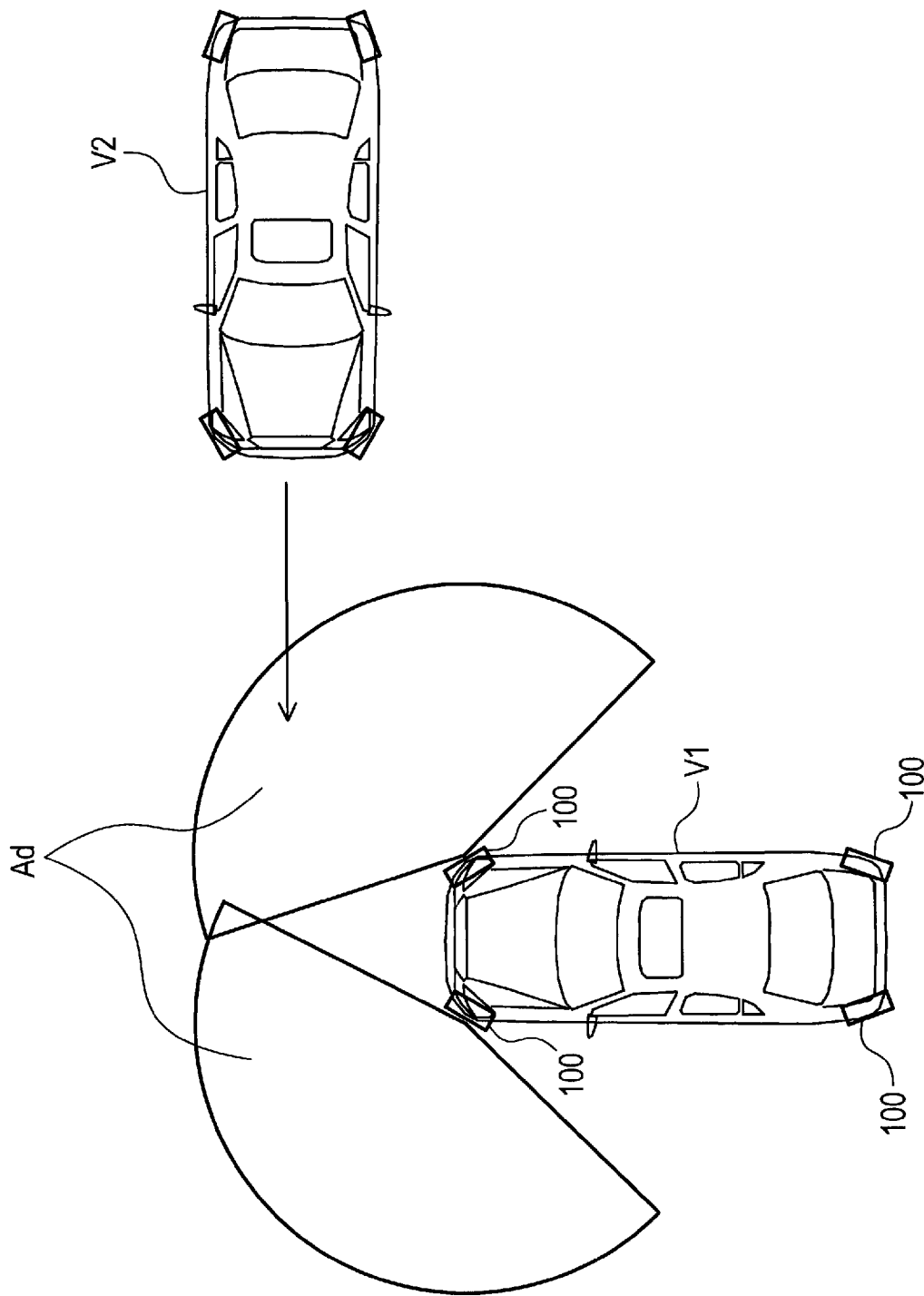
FIG. 10 is a chart showing detection areas when FCTA is in operation.

Next, FIG. 10 shows the state of an FCTA operation. FCTA stands for Front Cross Traffic Alert. The FCTA operation is an operation to detect another vehicle V2 crossing the front of the host vehicle V1. When execution of the FCTA operation is selected, the transmission control unit 32 operates the radar device 100 mounted on each of the left front side and the right front side of the host vehicle V1 in the MIMO mode. In this case, similarly to the RCTA operation, the detection areas Ad extend in a wide angular range and are ranges at a relatively short distance from the radar device 100 mounted on each of the left front side and the right front side.

Figure 11:
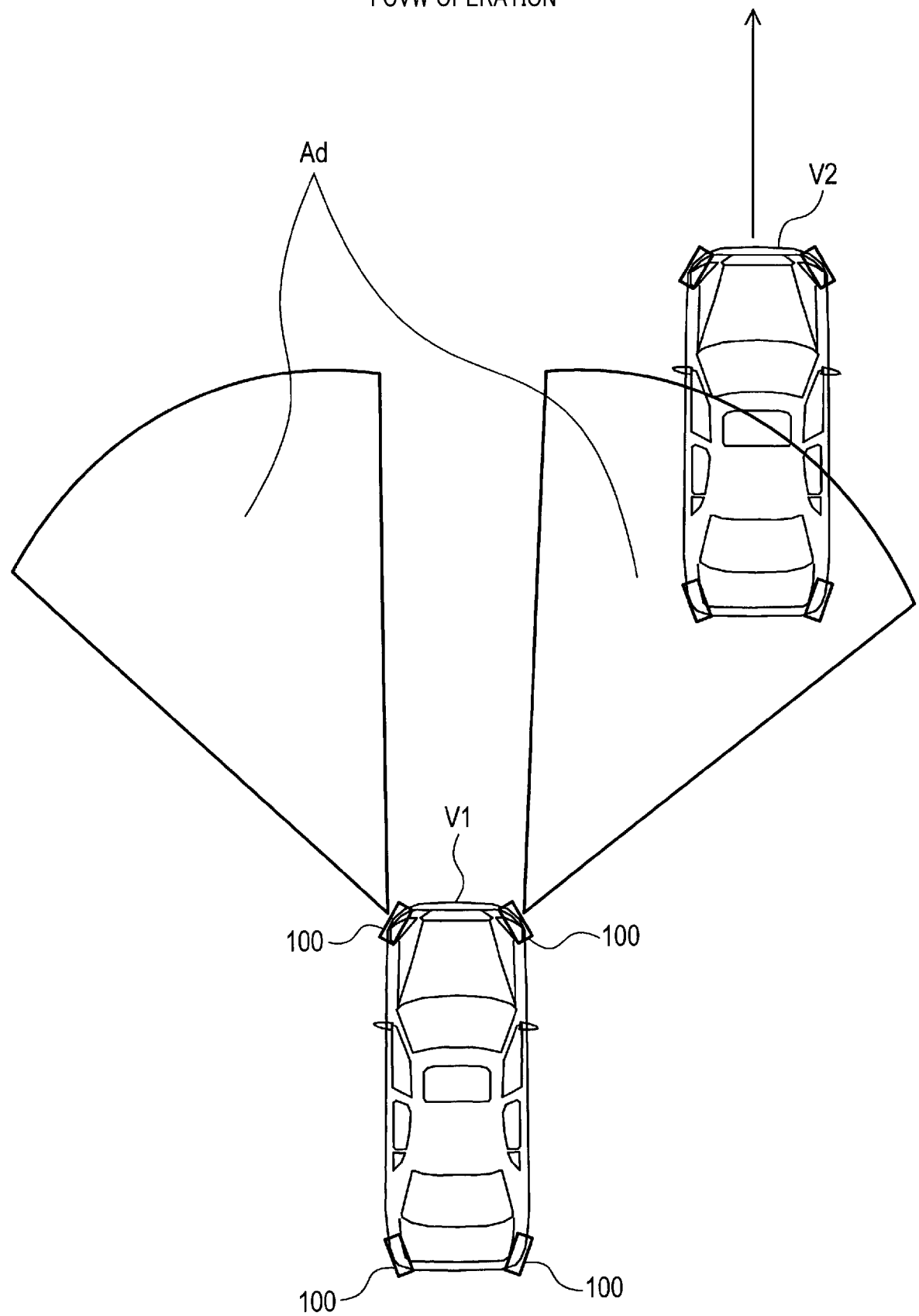
FIG. 11 is a chart showing detection areas when FCVW is in operation.

Next, FIG. 11 shows a state of a FCVW operation. FCVW stands for Front Closing Vehicle Warning. The FCVW operation is an operation to detect another vehicle V2 approaching from the front of the host vehicle V1. When execution of the FCVW operation is selected, the transmission control unit 32 operates the radar device 100 mounted on each of the left front side and the right front side of the host vehicle V1 in the phased array mode. In this case, similarly to the RCVW operation, the detection areas Ad extend in a narrow angular range and are at ranges at a relatively long distance from the radar device 100 mounted on each of the left front side and the right front side.

Figure 12:
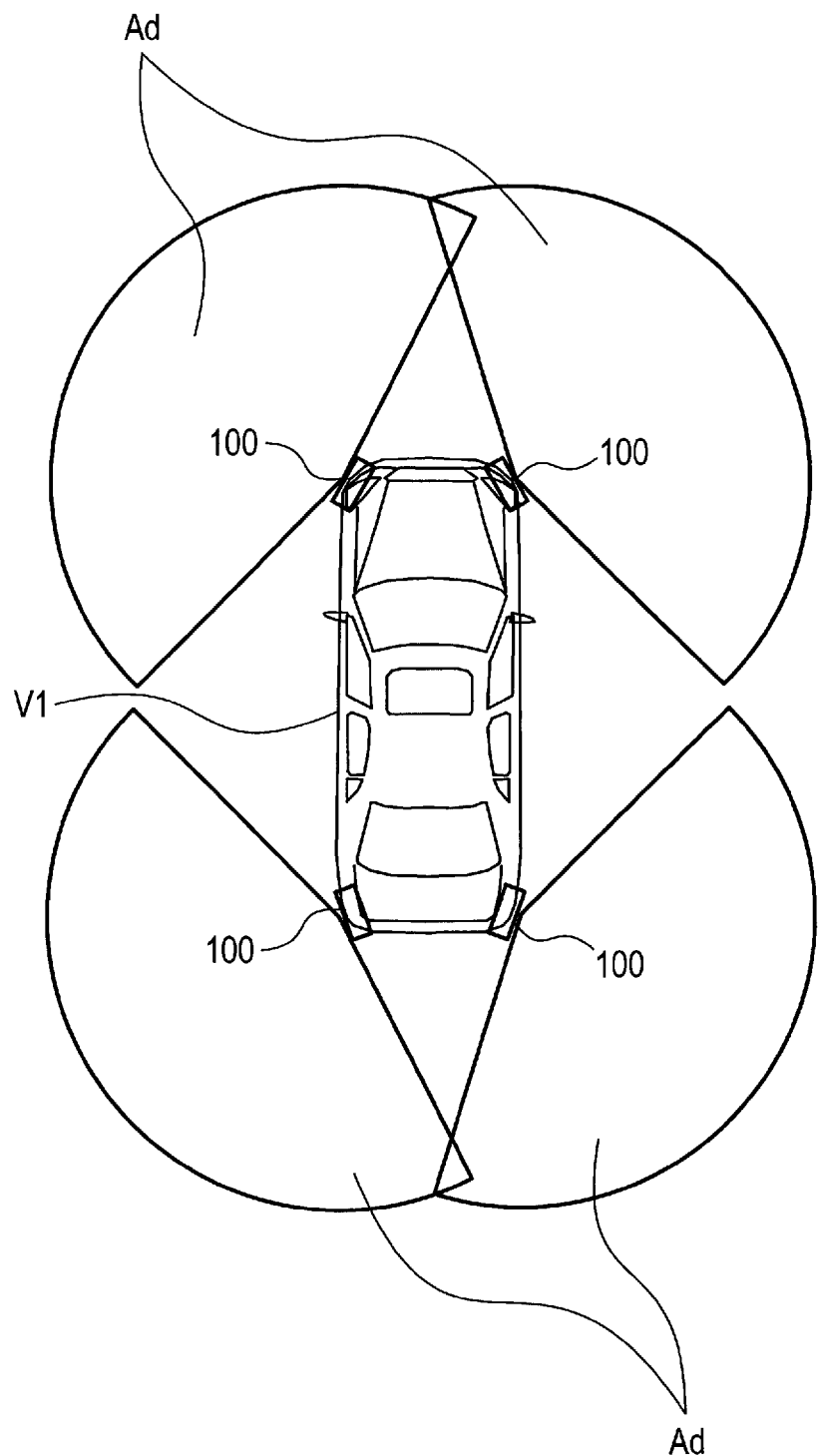
FIG. 12 is a chart showing detection areas when CTA is in operation.

Next, FIG. 12 shows a state of a CTA operation. The CTA operation is an operation to detect another vehicle V2 crossing the front or the rear of the host vehicle V1. When execution of the CTA operation is selected, the transmission control unit 32 operates the radar device 100 mounted on each of the four locations of the host vehicle V1 in the MIMO mode. In this case, the detection areas Ad extend in ranges combining the detection areas of RCTA operation and the detection areas of FCTA operation.

Figure 13:
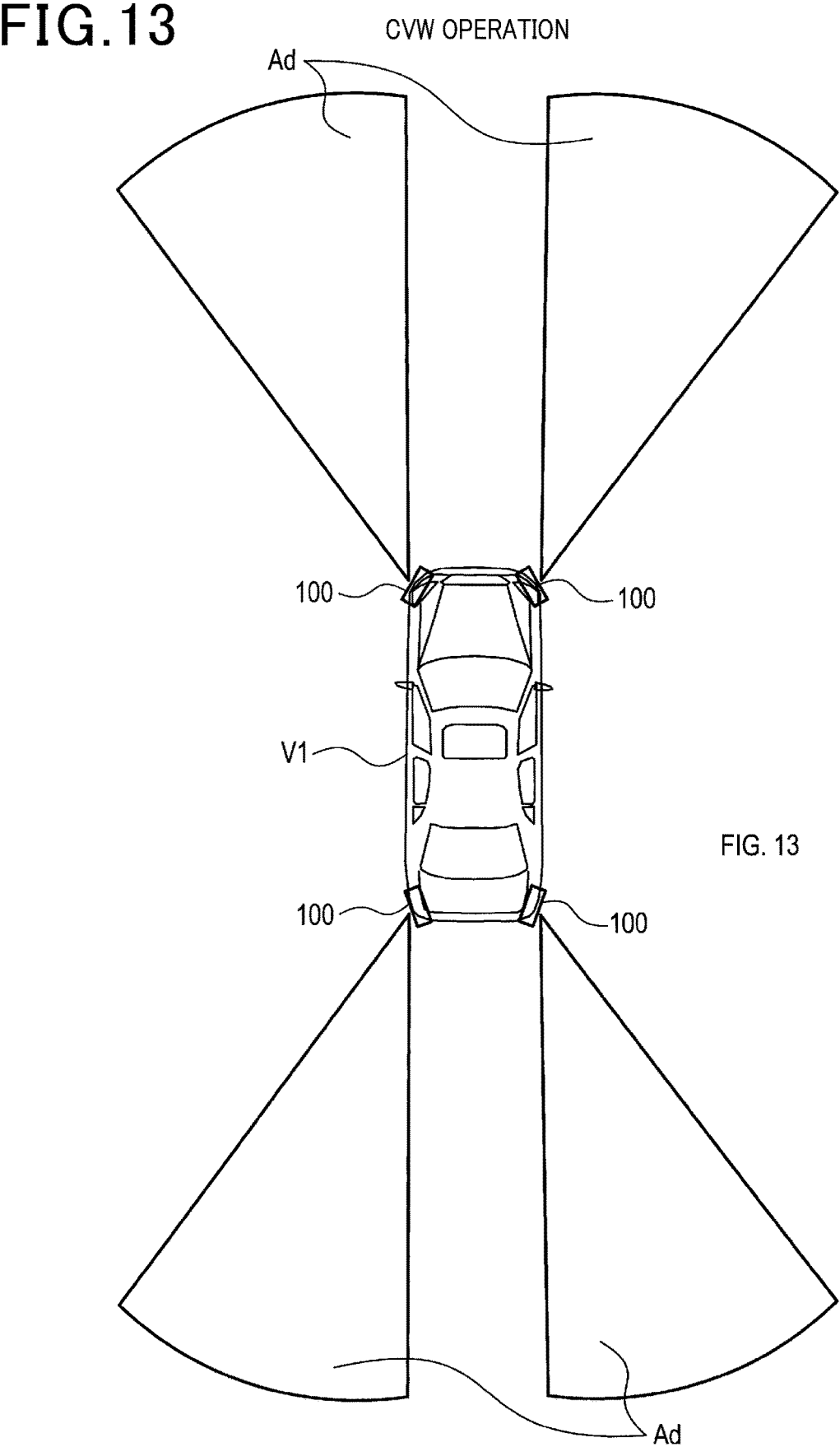
FIG. 13 is a chart showing detection areas when CVW is in operation.

Next, FIG. 13 shows a state of a CVW operation. The CVW operation is an operation to detect another vehicle V2 approaching from the front or the rear of the host vehicle V1. When execution of the CVW operation is selected, the transmission control unit 32 operates the radar device 100 mounted on each of the four locations of the host vehicle V1 in the phased array mode.

In this case, the detection areas Ad extend in ranges combining the detection areas of RCVW operation and the detection areas of FCVW operation.

Meanwhile, the RCTA operation, the FCTA operation, and the CTA operation correspond to the crossing vehicle detection operation, and the RCVW operation, the FCVW operation, and the CVW operation correspond to the approaching vehicle detection operation. In the present embodiment, the radar device 100 executes a CTA operation as a crossing vehicle detection operation, and executes a CVW operation as an approaching vehicle detection operation.

Moreover, the installation locations and the number of the radar devices 100 are not limited to those of the examples mentioned above. For example, the radar devices 100 may be mounted at the front center and the rear center of the host vehicle V1 in addition to the four radar devices 100, or only two radar devices 100 may be mounted at the front center and the rear center. Moreover, when the radar device 100 only performs the FCTA operation and the FCVW operation, one radar device 100 may be mounted at the front center, or two radar devices may be mounted at the front left side and the front right side, or three radar devices may be mounted at the front center, front left side and the front right side. Moreover, when the radar device 100 only performs the RCTA operation and the RCVW operation, one radar device 100 may be mounted at the rear center, or two radar devices may be mounted at the rear left side and the rear right side, or three radar devices may be mounted at the rear center, rear left side and the rear right side.

[5. Target Detection Processing]

Figure 14:
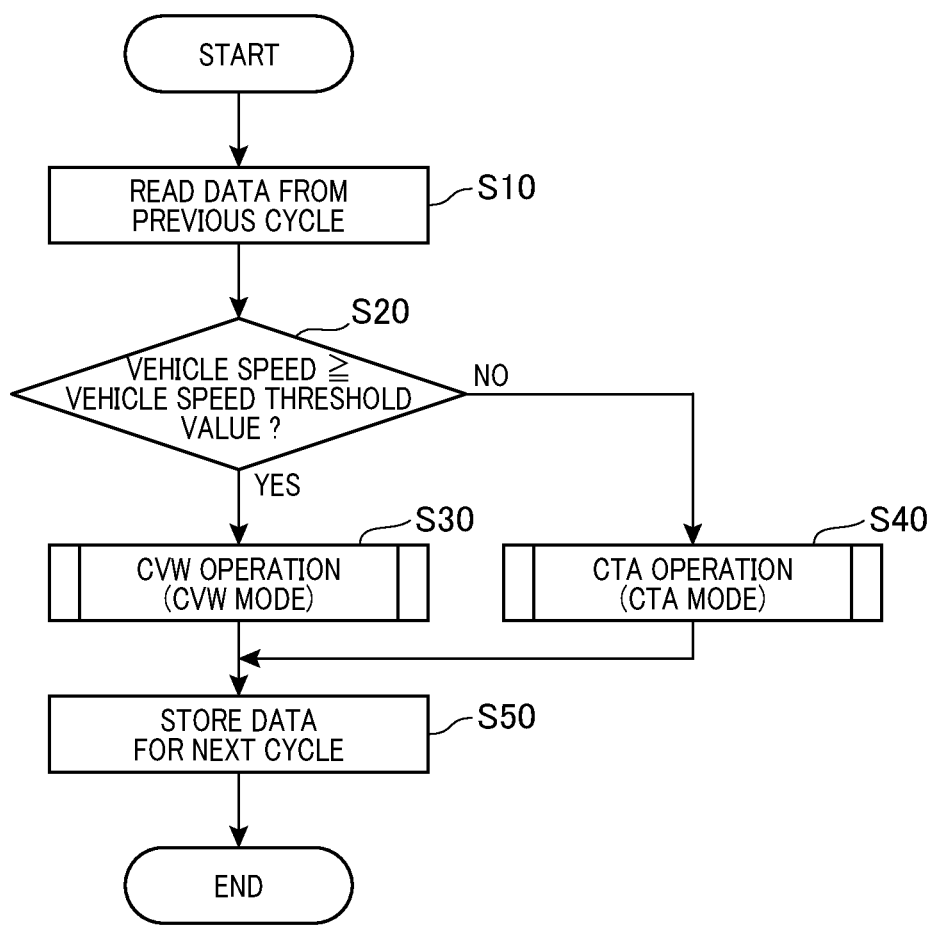
FIG. 14 is a flow chart showing processing procedures of target detection processing.
Figure 15:
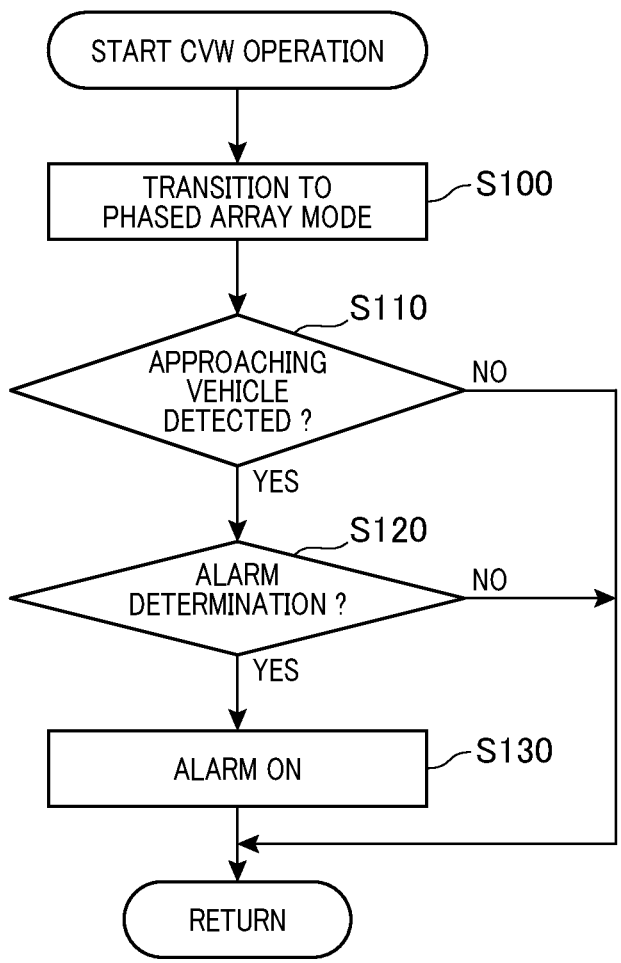
FIG. 15 is a flow chart showing processing procedures of CVW operation.

Next, processing procedures of a target detection processing to detect the target P in the vicinity of the host vehicle will be described with reference to the flowcharts of FIGS. 14 to 16. The transmission unit 30 and the signal processing unit 70 repeatedly perform the processing procedures for each radar device 100 at a predetermined cycle.

First, in S10, the signal processing unit 70 reads data from the previous processing cycle. The signal processing unit 70 reads data such as relative speed, distance, orientation and the like of target P detected in the previous processing cycle. That is, the signal processing unit 70 reads the data acquired in the previous processing cycle and stored in the memory.

Subsequently, in S20, the transmission unit 30 determines whether the vehicle speed of the host vehicle V1 received from the vehicle speed sensor 11 is equal to or higher than a preset vehicle speed threshold value Vth. The value of Vth is set, for example, at 30 km/h. Then, when the vehicle speed is equal to or higher than the vehicle speed threshold value Vth, the process proceeds to S30, and the CVW operation is selected and performed. On the other hand, when the vehicle speed is less than the vehicle speed threshold value Vth, the process proceeds to S40, and the CTA operation is selected and performed.

At this time, the vehicle speed threshold value Vth may be set in two stages of Vth1, Vth2, and Vth1>Vth2. The values of Vth1 and Vth2 are set, for example, at 40 km/h and 20 km/h. Specifically, when the CVW operation is selected in the previous processing cycle, the process proceeds to S30 when the vehicle speed is equal to or higher than the vehicle speed threshold value Vth2, and proceeds to step S40 when the vehicle speed is less than the vehicle speed threshold value Vth2. On the other hand, when the CAT operation is selected in the previous processing cycle, the process proceeds to S30 when the vehicle speed is equal to or higher than the vehicle speed threshold value Vth1, and proceeds to step S40 when the vehicle speed is less than the vehicle speed threshold value Vth1. As such, frequent switching of the detection operation is controlled by setting the vehicle speed threshold value in two stages.

In S30, the transmission unit 30 and the signal processing unit 70 perform the CVW operation to output an alarm when there is a possibility of a collision with the other vehicle V2. On the other hand, in S40, the transmission unit 30 and the signal processing unit 70 perform the CTA operation to output an alarm when there is a possibility of a collision with the other vehicle V2. After the CVW operation is performed in S30, and after the CTA operation is performed in S40, the process proceeds to S50. Details of performing the CVW operation and processing the CTA operation will be described later.

In S50, the signal processing unit 70 stores data for the next processing cycle. The signal processing unit 70 stores data such as relative speed, distance, and orientation and the like of target P detected in the current processing cycle to the next processing cycle. That is, the signal processing unit 70 stores the data acquired in the current processing cycle in the memory. This completes the process.

[5-1. CVW Operation]

Next, the processing procedures of the CVW operation will be described with reference to the flowchart of FIG. 15. The transmission unit 30 and the signal processing unit 70 perform the processing procedures.

First, in S100, the transmission unit 30 operates the radar device 100 in the phased array mode to transmit transmission waves.

Subsequently, in S110, the signal processing unit 70 determines whether the other vehicle V2 approaching the host vehicle V1 in the front-rear direction has been detected. Specifically, the signal processing unit 70 generates a beat signal from the transmission signal and the reception signal, detects a moving target P from the generated beat signal, and estimates the relative speed, distance and orientation of the detected target P.

Then, the signal processing unit 70 calculates the motion vector of the target P from the data of the previous processing cycle read in S10 and the data acquired in the current processing cycle. When the signal processing unit 70 detects a plurality of targets P, it calculates the motion vector of each of the targets P.

Furthermore, when the calculated motion vector is heading for the host vehicle V1 from the front or the rear of the host vehicle V1, the signal processing unit 70 determines that approaching another vehicle V2 has been detected. When a target P is not detected, or when the motion vector is not heading for the host vehicle V1, the signal processing unit 70 determines that no approaching another vehicle V2 has been detected.

In S110, when the signal processing unit 70 determines that approaching another vehicle V2 has been detected, the process proceeds to S120. On the other hand, in S110, when the signal processing unit 70 determines that no approaching another vehicle V2 has been detected, the current process ends, and the process proceeds to S50.

In S120, the signal processing unit 70 determines whether to output an alarm. That is, the signal processing unit 70 determines whether there is a possibility that the other vehicle V2 that is approaching and the host vehicle V1 collide with each other. Specifically, when one or more of the following conditions (i) to (iv) are met, the signal processing unit 70 determines that there is a possibility of a collision, and decides to output an alarm.

(i) In the traveling direction of the host vehicle V1, the other vehicle V2 is present within the distance threshold value Rth from the host vehicle V1.

(ii) The relative speed of the other vehicle V2 is equal to or higher than the speed threshold value Vrth.

(iii) The other vehicle V2 has been detected for more than the frequency threshold value Xth so far.

(iv) The distance between the host vehicle V1 and the other vehicle V2 in the lateral direction is within the distance threshold value Wth, and the host vehicle V1 operates a turn signal in the direction of the other vehicle V2.

In S120, when the signal processing unit 70 decides to output an alarm, the process proceeds to S130, and the alarm device 200 outputs an alarm. Then, the process ends, and the process proceeds to S50. On the other hand, in S120, when the signal processing unit 70 determines not to output an alarm, the current process ends, and the process proceeds to S50.

[5-2. CTA Operation]

Next, the processing procedures of the CTA will be described with reference to the flowchart of FIG. 16. The transmission unit 30 and the signal processing unit 70 perform the processing procedures.

First, in S200, the transmission unit 30 operates the radar device 100 in the MIMO mode to transmit transmission waves.

Subsequently, in S210, the signal processing unit 70 determines whether another vehicle V2 crossing the front or the rear of the host vehicle V1 has been detected. Specifically, similarly to the process of S110, the signal processing unit 70 calculates the motion vector of a target P. Then, when the calculated motion vector is heading for the host vehicle V1 from the lateral direction of the host vehicle V1, the signal processing unit 70 determines that another vehicle V2 that is crossing has been detected. When a target P is not detected, or when the motion vector is not heading for the host vehicle V1, the signal processing unit 70 determines that another vehicle V2 that is crossing has not detected.

In S210, when the signal processing unit 70 determines that another vehicle V2 that is crossing has been detected, the process proceeds to S220. On the other hand, in S210, when the signal processing unit 70 determines that the other vehicle V2 that is crossing is not detected, the current process ends, and the process proceeds to S50.

In S220, similarly to the process of S120, the signal processing unit 70 determines whether to output an alarm. That is, the signal processing unit 70 determines whether there is a possibility that the other vehicle V2 that is crossing and the host vehicle V1 collide with each other. Specifically, when the following condition (v) is met, the signal processing unit 70 decides to output an alarm.

(v) The moving direction of the host vehicle V1 intersects with the moving direction of the other vehicle V2, and the point of intersection is reached within the time threshold value Tth.

In S220, when the signal processing unit 70 decides to output an alarm, the process proceeds to S230, and the alarm device 200 outputs an alarm. Then, the current process ends, and the process proceeds to S50. On the other hand, in S220, when the signal processing unit 70 determines not to output an alarm, the current process ends, and the process proceeds to S50.

[5. Effects]

According to the present embodiment described above, the following effects can be obtained.

(1) It is possible to operate the radar device 100 in either one of the phased array mode or the MIMO mode. In a situation where target P present in a specific direction should be detected, the phased array mode is selected, and therefore, a target present in a specific direction can be accurately detected. On the other hand, in a situation where a target present in a wide angular range should be detected, the MIMO mode is selected, and therefore, a virtual array antenna is configured and it is possible to accurately estimate the orientation of a target detected in a wide angular range. Therefore, a hardware configuration of the radar device 100 provided with the plurality of transmission radar elements can be effectively used, and excellent performance can be realized.

(2) At the time of selecting the MIMO mode, by using phase shifters 41a to 41e provided to control the directivity of the transmission array antenna 50, it is possible to simultaneously transmit transmission waves that are different from one another from two or more transmission antenna elements. That is, hardware for the phased array mode can be effectively used, and it is possible to operate the radar device 100 in the MIMO mode.

(3) At the time of selecting the MIMO mode, by controlling the phase shifters 41a to 41e, it is possible to transmit transmission waves with different frequencies from one another from two or more transmission antenna elements.

(4) At least one of the distances between the transmission antenna elements is set to N×Dr or more. Thereby, if two or more transmission antenna elements having mutual distances of N×Dr or more are selected at the time of selecting the MIMO mode, a virtual array antenna can be configured at a position not overlapping the position of the reception array antenna 60. As a result, the reception signal received by the reception antenna elements can be separated from the reception signal received by the virtual antenna elements.

(5) The distance Dt between adjoining transmission antennas is set to Dr×N/(M−1) or more. Thereby, if the two outermost transmission antenna elements are selected at the time of selecting the MIMO mode, a virtual array antenna can be configured at a position not overlapping the position of the reception array antenna 60.

(6) By switching between the phased array mode and the MIMO mode depending on the running conditions of the host vehicle V1, the target P to be detected can be detected from the appropriate detection areas Ad depending on the running conditions of the host vehicle V1, and highly accurate information of the target P can be obtained.

(7) Depending on the vehicle speed of the host vehicle V1, a detection operation of either one of the CVW operation or the CTA operation is selected. Further, when the CVW operation is selected, the radar device 100 operates in the phased array mode, and can accurately detect the other vehicle V2 approaching the host vehicle V1 in the front-rear direction. On the other hand, when the CTA operation is selected, the radar device 100 operates in the MIMO mode, detects the other vehicle V2 crossing the front or the rear of the host vehicle V1, and can accurately estimate the orientation of the other vehicle V2.

(8) When the host vehicle V1 is traveling at high speed equal to or higher than the speed threshold value Vth, the radar device 100 operates in the phased array mode, since it is necessary to be detected the other vehicle V2 approaching in the front-rear direction of the host vehicle V1. On the other hand, when the host vehicle V1 is traveling at low speed less than the speed threshold value Vth, the radar device 100 operates in the MIMO mode, since it is necessary to avoid other vehicles crossing the front or the rear of the host vehicle V1. Thereby, it is possible to obtain highly accurate information of the other vehicle V2 depending on the speed of the host vehicle V1.

Other Embodiments

Although embodiments of the present disclosure have been described above, the present disclosure is not limited to the embodiments mentioned above, and can be modified and implemented in various ways.

(a) In the embodiments mentioned above, the radar device 100 in the front of the host vehicle V1 and the radar device 100 in the rear perform the same detection operation. However, the radar device 100 in the front and the radar device 100 in the rear may perform different detection operations. Specifically, as shown by broken lines in FIG. 1, the detection operation selecting unit 31 receives not only the vehicle speed information, but also the shift position information from a shift device 12, and based on the vehicle speed information and the shift position information, detection operation may be selected for the front and the rear independently.

For example, when the shift position is in drive, the rear radar device 100 may perform the RCVW operation regardless of the vehicle speed, and the front radar device 100 may perform the FCVW operation at high speed, and the FCTA operation at low speed. Moreover, when the shift position is in reverse, the rear radar device 100 may perform the RCTA operation regardless of the vehicle speed, and the front radar device 100 may perform the FCVW operation at high speed and the FCTA operation at low speed. The front radar device 100 and the rear radar device 100 each select the detection operation, and thereby other vehicles to be avoided can be more appropriately detected.

(b) In the embodiments mentioned above, by controlling the phase shifters in the MIMO mode, the transmission frequency is changed to simultaneously transmit transmission waves of different transmission frequencies. However, the present disclosure is not limited to such embodiments. If it is possible to simultaneously transmit transmission waves that do not interfere with one another from a plurality of transmission antenna elements by controlling the phase shifters, it is possible to control factors other than the transmission frequency. Moreover, the phase shifter does not need to be provided for each of the transmission antenna elements 50a to 50e. The phase shifter has only to be provided for each of at least two of the transmission antenna elements 50a to 50e.

(c) In the embodiments mentioned above, the radar device 100 is mounted on a vehicle and used. However, the present disclosure is not limited to such embodiments. The radar device 100 may be installed at a predetermined measurement point to perform fixed point measurement. In this case, depending on measurement conditions such as weather, the radar device 100 may be operated by switching between the phased array mode and the MIMO mode.

(d) More than one function that one constituent element has in the embodiments mentioned above may be realized by more than one constituent elements, or one function that one constituent element has may be realized by more than one constituent elements. Moreover, more than one function that more than one constituent element has may be realized by one constituent element, or one function that is realized by more than one constituent element may be realized by one constituent element. Moreover, a portion of a constituent of the embodiments mentioned above may be omitted. Moreover, at least a portion of a constituent of the embodiments mentioned above may be added to or substituted by a constituent of other embodiments mentioned above. Meanwhile, all aspects contained in the concept specified only by the words recited in the claims are embodiments of the present disclosure.

(e) In addition to the radar device mentioned above, the present disclosure can be realized by various aspects such as a system including the radar device as a constituent element, an object detecting method and the like.

What is claimed is:

1. A radar device comprising:
   a transmission array antenna provided with a plurality of transmission antenna elements, and configured to transmit transmission waves;
   a plurality of phase shifters each provided to the plurality of the transmission antenna elements, and configured to change the phase of the transmission waves transmitted from each of the transmission antenna elements provided with the phase shifter;

a reception array antenna provided with a plurality of reception antenna elements, and configured to receive reflected waves generated by a target reflecting the transmitted transmission waves;

a transmission control unit configured to transmit the transmission waves via the transmission array antenna by either a directivity control mode or a MIMO mode, wherein the directivity control mode is an operation mode of the radar device that controls directivity of the transmission waves, by individually controlling the phases of the transmission waves transmitted from each of the transmission antenna elements using the plurality of phase shifters, and the MIMO mode is an operation mode of the radar device that selects at least two of the transmission antenna elements from the plurality of transmission antenna elements, and transmits the transmission waves so as not to interfere with each other from the selected transmission antenna elements; and a signal processing unit configured to estimate an orientation of the target from the reflected waves received by the reception array antenna wherein the transmission control unit is configured to:

when detecting the target present in a specific direction, transmit the transmission waves using the directivity control mode to control directivity; and when detecting the target present in a wide range of directions, transmit the transmission waves using the MIMO mode such that the transmission waves from the selected transmission antenna elements do not interfere with each other.

2. The radar device according to claim 1, wherein the transmission control unit, when transmitting the transmission waves in the MIMO mode, is configured to simultaneously transmit different transmission waves from the at least two transmission antenna elements by controlling at least one of the phase shifters among the phase shifters provided to the at least two transmission antenna elements.

3. The radar device according to claim 2, wherein the transmission control unit, when transmitting the transmission waves in the MIMO mode, is configured to transmit transmission waves with different frequencies from the at least two transmission antenna elements by controlling at least one of the phase shifters among the phase shifters provided to the at least two transmission antenna elements.

4. The radar device according to claim 1, wherein the plurality of reception antenna element is arranged on a straight line at equal distances, and at least one of the distances between the transmission antenna elements is N×Dr or more, wherein N is the number of the plurality of reception antenna elements and is 2 or larger, and Dr is the distance between the adjoining reception antenna elements.

5. The radar device according to claim 4, wherein the plurality of transmission antenna elements is arranged on a straight line at equal distances, and the distance between the adjoining transmission antenna elements is Dr×N/(M−1) or more, wherein M is the number of the plurality of transmission antenna elements and is an integer that is 2 or larger.

6. The radar device according to claim 1, wherein the radar device is mounted on a vehicle, and the transmission control unit is configured so that the directivity control mode and the MIMO mode can be shifted depending on at least the running conditions of the vehicle.

7. The radar device according to claim 6, wherein the radar device is provided with a detection operation selecting unit configured to select a detection operation of either an approaching vehicle detection operation or a crossing vehicle detection operation, wherein the approaching vehicle operation is a detection operation of the radar device that detects other vehicles approaching the vehicle in the front-rear direction, and the crossing vehicle detection operation is a detection operation of the radar device that detects other vehicles approaching the vehicle from the lateral direction, and the transmission control unit is configured such that, when the approaching vehicle detection operation is selected by the detection operation selecting unit, it transmits the transmission waves in the directivity control mode, and when the crossing vehicle detection operation is selected by the detection operation selecting unit, it transmits the transmission waves in the MIMO mode.

8. The radar device according to claim 6, wherein the transmission control unit is configured such that, when the speed of the host vehicle is equal to or more than the speed threshold value set in advance, it transmits the transmission waves in the directivity control mode, and when the speed of the host vehicle is less than the speed threshold value, it transmits the transmission waves in the MIMO mode.

* * * * *